United States Patent [19]
Enright

[11] 3,894,618
[45] July 15, 1975

[54] DISC BRAKE
[75] Inventor: John J. Enright, Troy, Ohio
[73] Assignee: The B. F. Goodrich Company, Akron, Ohio
[22] Filed: June 27, 1973
[21] Appl. No.: 373,932

[52] U.S. Cl. .................. 188/72.2; 188/26; 188/73.3
[51] Int. Cl. ............................................ F16d 55/02
[58] Field of Search ............ 188/24, 26, 72.2, 72.3, 188/72.1, 73.6, 73.3, 216, 2 D

[56] References Cited
UNITED STATES PATENTS
| | | | |
|---|---|---|---|
| 3,318,420 | 5/1967 | Adams | 188/72.3 |
| 3,680,663 | 8/1972 | Kine | 188/24 |

FOREIGN PATENTS OR APPLICATIONS
| | | | |
|---|---|---|---|
| 863,150 | 3/1961 | United Kingdom | 188/72.3 |
| 1,045,319 | 11/1953 | France | 188/24 |
| 1,019,873 | 11/1957 | Germany | 188/72.2 |
| 412,104 | 10/1945 | Italy | 188/24 |

Primary Examiner—Trygve M. Blix
Assistant Examiner—Edward R. Kazenske
Attorney, Agent, or Firm—W. A. Shira, Jr.

[57] ABSTRACT

A disc brake apparatus in which friction lining pads on opposite sides of a rotatable brake disc are connected to a nonrotatable frame by arms mounted on the frame for swinging movement toward and away from the surfaces of the rotatable disc. During the swinging movement of the arms toward the surfaces of the rotating disc, the friction lining pads are guided in substantially the same direction as the direction of rotation of the disc providing self-energization of the brake after engagement of the friction lining pads with the surface of the disc. The arms are swung toward the surface of the rotatable disc by a cable actuated mechanism and are urged away from the surface by springs which incorporate the swinging arms.

24 Claims, 9 Drawing Figures

PATENTED JUL 15 1975 3,894,618

SHEET 1

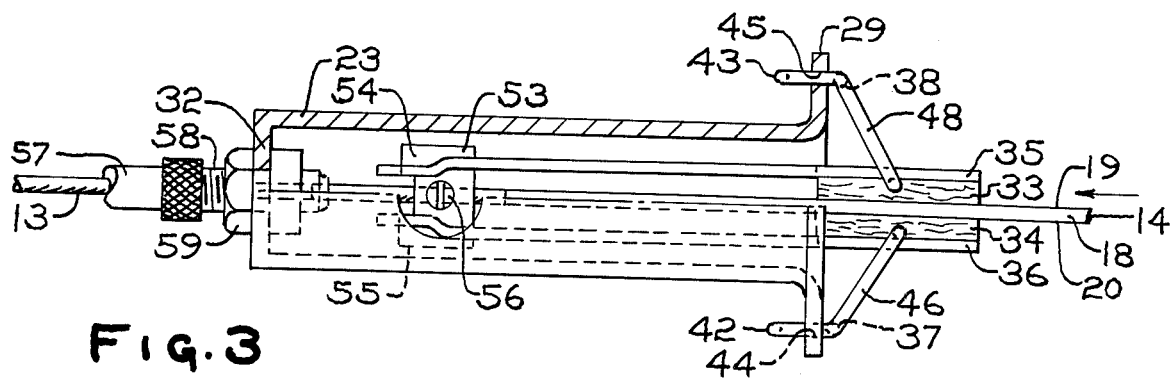
Fig. 3
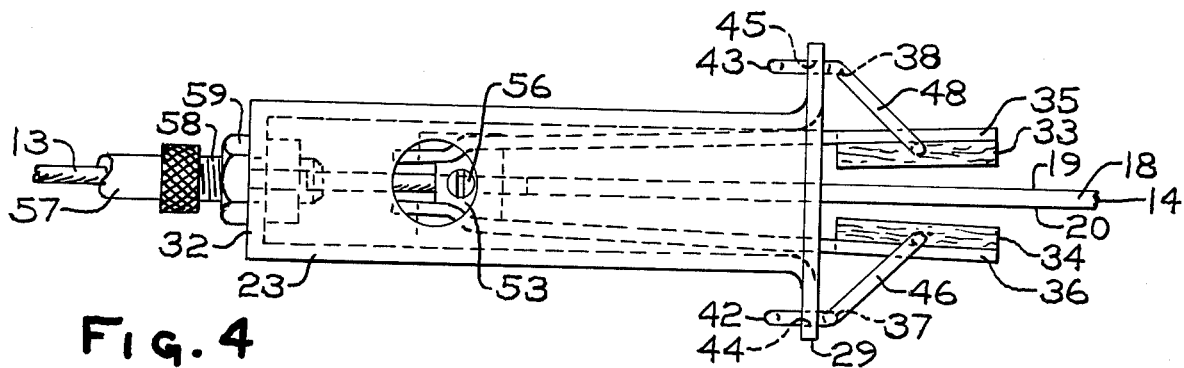
Fig. 4
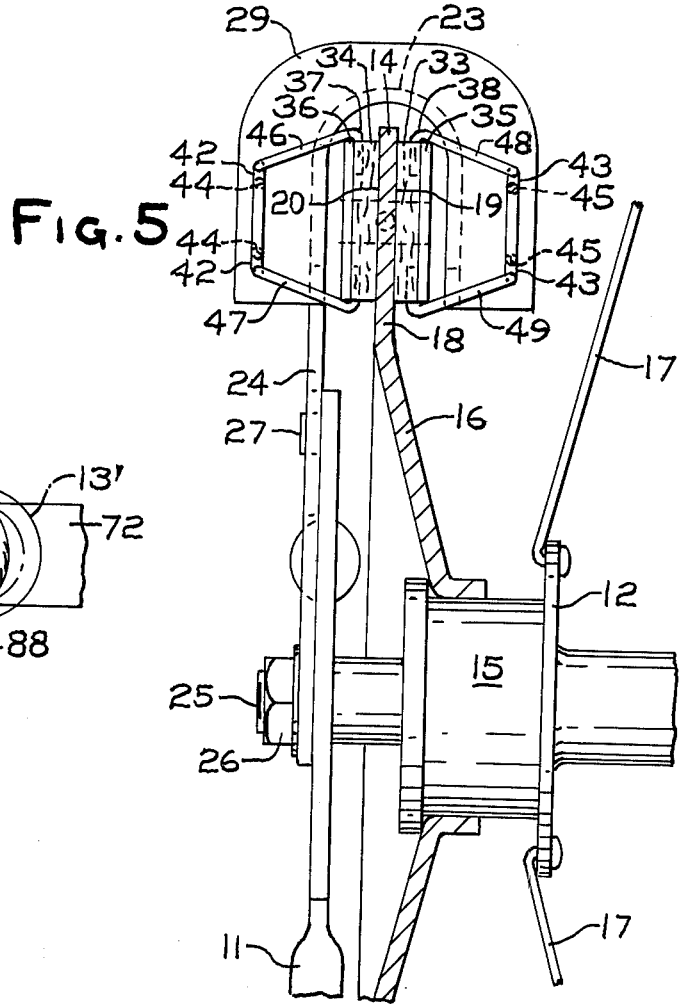
Fig. 5
Fig. 9

DISC BRAKE

BACKGROUND OF THE INVENTION

This invention relates to a caliper type disc brake for a bicycle or other light weight applications. This type of brake is superior to a rim type brake in that it retains its effectiveness when wet, does not fade at high speeds or when applied continuously down a long hill, and does not wear out quickly. The reason rim brakes are inferior is that they must rely on rubber type friction material in order not to abrade and damage the lightweight wheel rim's appearance or strength. When wet, rubber on metal is an ineffective friction pair and is, in fact, commonly used for anti-friction marine bearings. Also, such rubber wears quickly and its friction coefficient decreases significantly with temperature, causing fade.

Although coaster type brakes are not affected by moisture, they are unsuitable for multi-speed bicycles because they cannot be used with the free-wheeling type hubs required by those bicycles. Also, coaster brakes tend to fade, are not durable, and are too complex for the average person to repair.

Disc brakes have not been adopted by most manufacturers because heretofore they have been either too heavy or too complex (and consequently too expensive) for acceptability to the bicycle riding public, or have not been clearly more effective than rim type brakes.

SUMMARY OF THE INVENTION

The disc brake of this invention is lighter and much simpler than disc brakes heretofore used on bicycles, and is clearly more effective than rim brakes. Also, it is more responsive, has much better "feel", and requires less adjustment than either rim brakes or other disc brakes. Further, lining replacement requires no tools or brake disassembly.

The brake of this invention includes a rotatable brake disc which may be mounted on a bicycle wheel and a pair of arms on opposite sides of the disc for swinging the friction lining pads into braking engagement with the brake disc. The arms are hingedly connected to a brake frame mounted on the bicycle. When the arms are pulled in one direction, the friction lining pads are moved into engagement with the faces of the discs in substantially the same direction as the direction of rotation of the disc so that the braking force of the lining pads against the friction surfaces of the discs is increased. In this way, the brake is self-energizing and decreases the braking force required of the operator. With the arms on both sides of the disc, the braking force applied by the friction lining pads to opposite sides of the disc can be equalized providing a symmetric actuation and even wear of the lining.

The friction lining pads are moved out of engagement with the friction surfaces of the disc by springs swinging the arms in a direction opposite to the direction of rotation of the disc. The utilization of flat springs or wire springs which may include these arms provides constructions which are economical to manufacture and maintain. The brake is adaptable for actuation by a cable with ease of adjustment and operation.

The accompanying drawings show one preferred form of the disc brake and a modification made in accordance with and embodying this invention and are representative of how this invention may be practiced.

BRIEF DESCRIPTION OF THE DRAWINGS

FIG. 3 is a plan view taken along the plane of line 3—3 of FIG. 1 showing the brake in the engaged condition, parts being broken away.

FIG. 4 is a view like FIG. 3 showing the brake in the retracted condition.

FIG. 5 is a sectional end view taken along the plane of line 5—5 of FIG. 1, parts being broken away.

FIG. 9 is a fragmentary sectional view taken along the plane of line 9—9 of FIG. 8.

DETAILED DESCRIPTION

Figure 1:
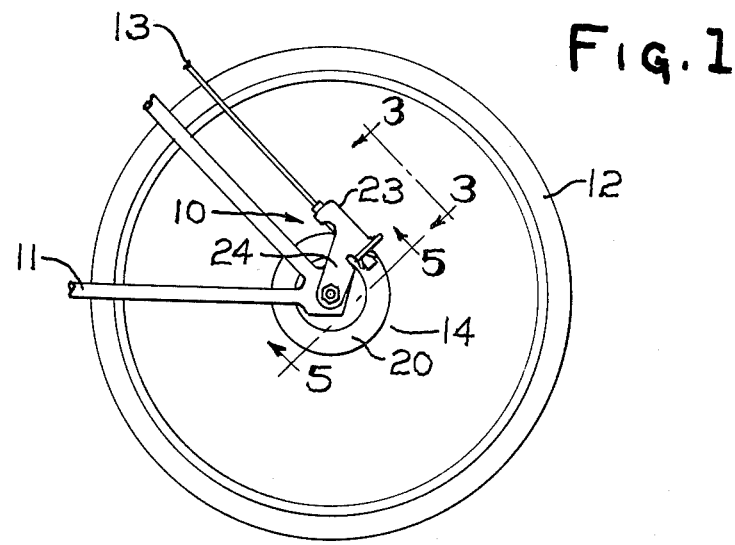
FIG. 1 is a side view of the rear wheel of a bicycle showing the caliper disc brake of this invention with parts of the frame and actuating cable fragmented.

A disc brake 10 is shown in FIG. 1 mounted on a bicycle frame 11 and bicycle rear wheel 12. The brake 10 is actuated by a cable 13 for applying tension to the brake and this cable extends to a handle mounted on the handlebars of the bicycle so that the operator can apply tension to the cable by squeezing the handle (not shown).

Figure 2:
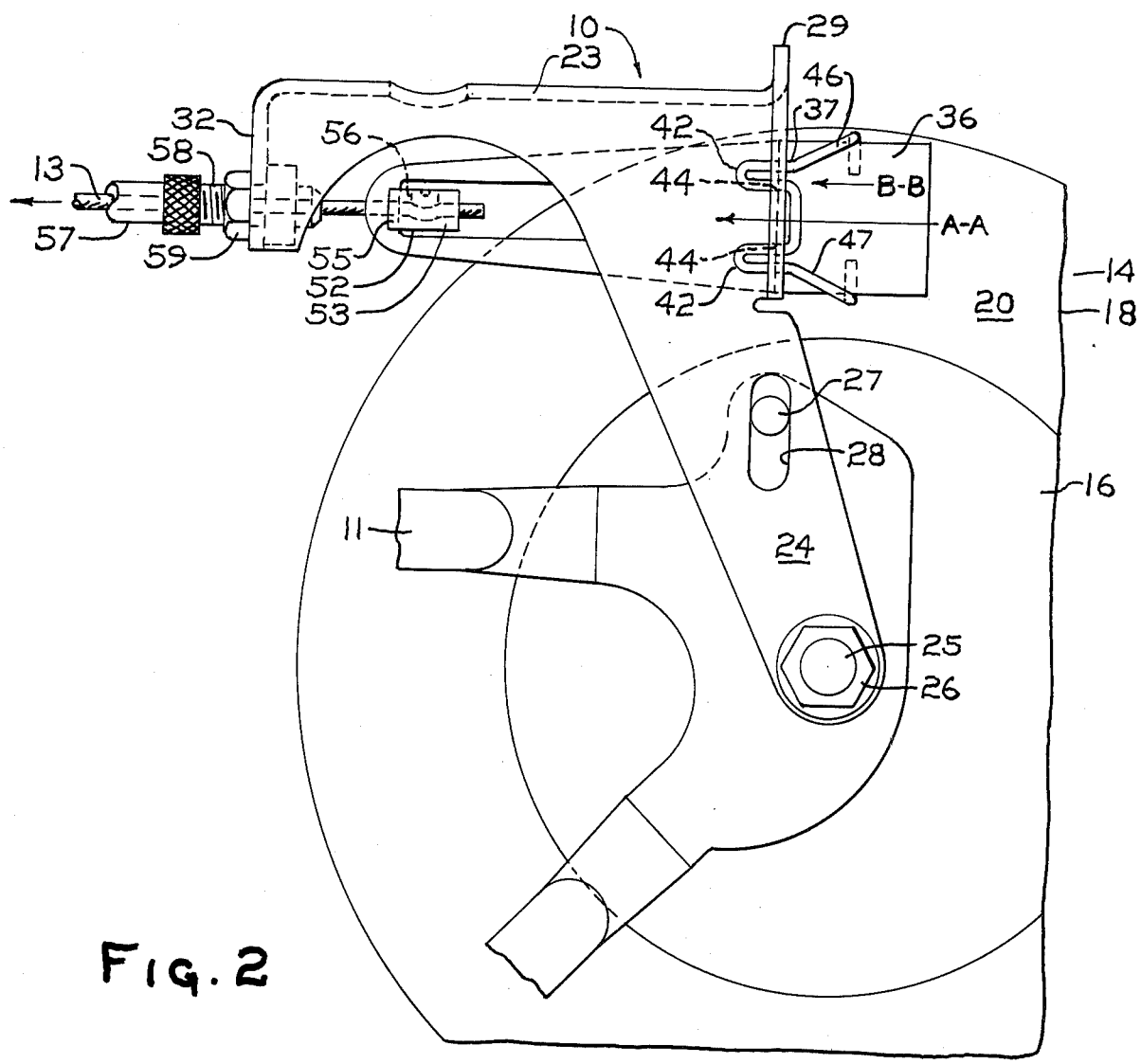
FIG. 2 is an enlarged fragmentary view of the disc brake shown in FIG. 1.

Referring to FIGS. 2 and 5, the brake 10 is shown in more detail. A rotatable disc 14 is mounted on a hub 15 of the wheel 12 and has a flared central portion 16 for offsetting the disc away from spokes 17 of the wheel. The disc 14 has an outer portion 18 with flat friction surfaces 19 and 20 on opposite sides of the outer portion.

A nonrotatable brake supporting body such as brake frame 23 has a supporting plate 24 extending downward where it fits over a threaded end 25 of the axle of wheel 12 and is clamped to the bicycle frame 11 by nut 26. A pin 27 mounted on the bicycle frame 11 extends into a slot 28 in the supporting plate 24 providing for adjustment and preventing rotation of the brake frame 23 relative to the bicycle frame. The brake frame 23 has a generally U-shaped cross section with an outwardly extending flange 29 at an open end and an end plate 32 at a closed end. The brake frame 23 is mounted on the bicycle frame 11 in a position such that the sides of the frame and the flange 29 extend around the rotatable disc 14 at the open end.

A pair of friction lining pads 33 and 34 are positioned on opposite sides of the friction surfaces 19 and 20 of the disc 14 in close proximity to the open end of the brake frame 23. The friction lining pads 33 and 34 are adhered to a pair of lining carriers 35 and 36 which extend towards the closed end of the brake frame 23.

The friction lining pads 33 and 34 are held in the retracted position, as shown in FIG. 4, by spring members such as wire springs 37 and 38 having projecting loops 42 and 43 which snap into slots 44 and 45 in the flange 29 on opposite sides of the disc 14 for mounting of the wire springs on the brake frame 23.

The wire springs 37 and 38 have arms 46, 47, 48 and 49 extending from the projecting loops 42 and 43 to the friction lining pads 33 and 34 and lining carriers 35 and 36 with the ends of the arms of each spring bent inwardly to fit into holes in the friction lining pads. The arms 46 and 47 of wire spring 37 and the arms 48 and 49 of the wire spring 38 extend outwardly towards the lining carriers 35 and 36 at an angle to the disc friction surfaces 19 and 20 so that the movement of the pads 33 and 34 is in a direction substantially the same as the direction of rotation of the disc as indicated by arrow A—A in FIG. 2.

The lining carriers 35 and 36 have openings 52 at the ends adjacent the closed end of the brake frame 23. A connecting member such as U-shaped bracket 53 extends through the openings 52 and has side flanges 54 and 55 overlapping the sides of the lining carriers 35 and 36. The surface of the bracket 53 in engagement with the edges of the lining carriers 35 and 36 is smooth permitting movement of the lining carriers to adjust for wear of the friction linings of pads 33 and 34. The bracket 53 has an opening for receiving the end of the cable 13 and a set screw 56 is in threaded engagement in the bracket for clamping the cable 13. The cable 13 is supported in a casing 57 fastened to a threaded sleeve 58 mounted on the end plate 32 of the brake frame 23 and held in place by a nut 59.

As shown in the drawings, the arms 46, 47, 48 and 49 are mounted on the flange 29 of the brake frame 23 so that upon actuation of the brake by movement of the cable 13 to the left, as shown in FIGS. 3 and 4, the friction lining pads 33 and 34 will be swung inwardly towards the disc 14 and into braking engagement with the friction surfaces 19 and 20 of the disc from the position shown in FIG. 4 to the position shown in FIG. 3. As shown in FIG. 2, the direction of movement of the pads 33 and 34 with the lining carriers 35 and 36, as shown by arrow A—A, is substantially the same as the direction of rotation of the disc 14, shown by arrow B-B. Accordingly, when the friction lining pads 33 and 34 are swung into braking engagement with the friction surfaces 19 and 20, as shown in FIG. 3, the forces exerted on the friction lining pads by the friction surfaces will tend to swing the arms 46, 47, 48 and 49 inwardly towards the friction surfaces and provide a self-energization of the brake decreasing the force required by the operator in applying tension to the cable 13 for actuating the brake.

In order to release the brake 10 and return it from the engaged condition shown in FIG. 3 to the retracted position shown in FIG. 4, the operator releases the tension on cable 13 and the friction lining pads 33 and 34 are swung outwardly away from the friction lining surfaces 19 and 20 of the disc 14 by the wire springs 37 and 38 and arms 46, 47 48 and 49. With this construction, the lining carriers 35 and 36 extend in a direction substantially the same as the direction of rotation of the disc 14, shown by arrow B—B, which is generally tangential to the disc and in the direction of arrow A—A shown in FIG. 2.

With the arms 46 and 47 of spring 37 on one side and arms 48 and 49 of spring 38 on the other side of the disc 14 the movement of the lining pads 33 and 34 against the friction surfaces 19 and 20 is substantially equal with the brake being symmetric about the plane of the disc. Accordingly, the lining wear of the pads 33 and 34 is the same and the disc 14 is not bent out of plane. As the linings of friction lining pads 33 and 34 wear, the lining carriers 35 and 36 will move along the surface of the bracket 53 keeping the lining carriers in parallel relationship for even wearing of the linings.

When the linings have worn, the lining carriers 35 and 36 can be removed by loosening set screw 56, removing the cable 13 and prying the arms 46, 47, 48 and 49 out of their slots in the lining pads 33 and 34. They can then be replaced with new lining carriers 35 and 36 with new pads 33 and 34, snapping them back into the frame 23 and readjusting the cable 13. Alternatively, a low temperature adhesive may be used to bond new pads 33 and 34 to the lining carriers 35 and 36 so that the carriers do not have to be replaced.

A modification is shown in FIGS. 6, 7, 8 and 9 in which a slightly different brake frame 62 has a supporting plate 63 with a slot 64 for receiving the threaded end 25 of the axle of rear wheel 12 shown in FIGS. 1 and 2. The pin 27 mounted on the bicycle frame 11 extends through a hole 65 in the plate 63. The brake frame 62 has an end plate 66 at the closed end and a flange 67 at the open end. The disc 14' is located between the sides of the brake frame 62 at the open end and has friction surfaces 19' and 20' on opposite sides for engagement by friction lining pads 68 and 69.

Figure 7:
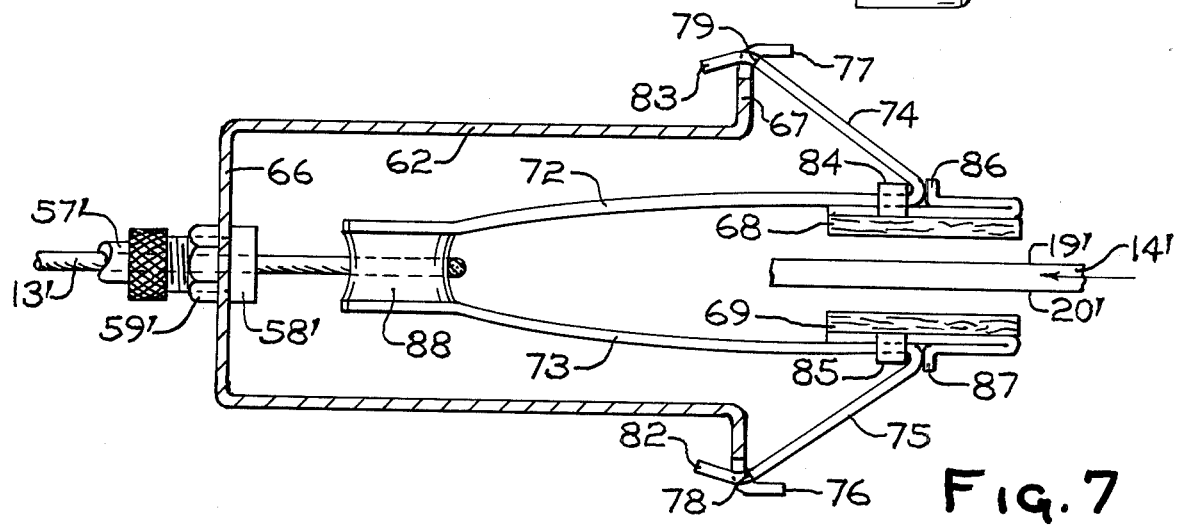
FIG. 7 is a plan view like FIG. 3 showing the brake of FIG. 6 in the retracted condition, parts being broken away.

A pair of flat springs 72 and 73 are interposed between the disc 14' and the sides of the brake frame 62. The flat springs 72 and 73 have outwardly extending arms 74 and 75 at the open end of the brake frame 62 which extend at an angle to the disc 14' toward the flange 67 of the brake frame. The flange 67 has pairs of hooks 76 and 77 on each side of the brake frame 62 for engaging edges 78 and 79 of the arms 74 and 75. Lugs 82 and 83 on the edges 78 and 79 extend between the hooks 76 and 77 to hold the flat springs 72 and 73 in position, as shown in FIG. 7. The flat springs 72 and 73 also serve as lining carriers and the friction lining pads 68 and 69 have clips 84 and 85 which slide down over the top edges of the flat springs. Flanges 86 and 87 are provided on the friction lining pads 68 and 69 for abutting the bent edges in the flat springs 72 and 73 and further holding the lining pads in position.

Figure 6:
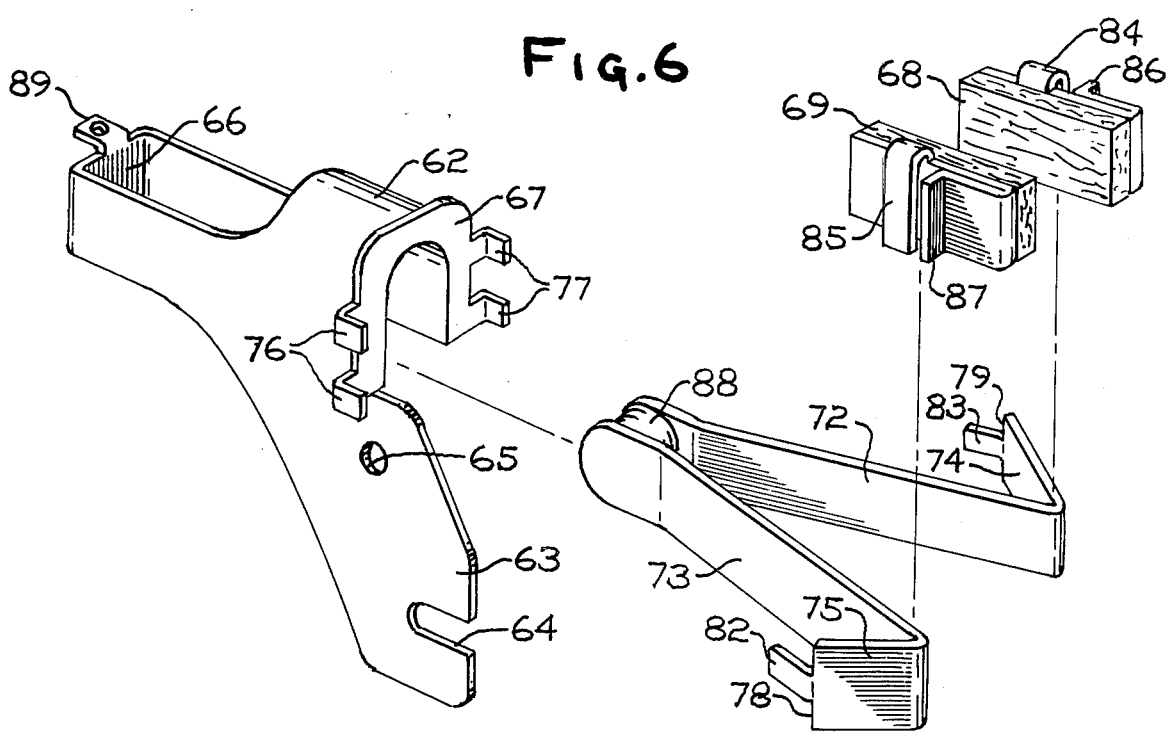
FIG. 6 is an exploded view in perspective of a modified caliper brake apparatus.

The other ends of the flat springs 72 and 73 adjacent the end plate 66 are connected together as by a spool 88 providing a one-piece spring member made up of flat springs 72, 73, spool 88 and arms 74 and 75. As shown in FIG. 6, this one-piece unit has a spread configuration in the unstressed condition. It is then mounted in the brake frame 62 by bringing together the flat springs 72 and 73 and inserting the edges 78 and 79 of the arms 74 and 75 within the hooks 76 and 77 and also placing the lugs 82 and 83 between the hooks. This results in a prestressed construction as shown in FIG. 7. The friction lining pads 68 and 69 may then by attached to the top edges of the flat springs 72 and 73 by clips 84 and 85.

At the end plate 66, the cable 13' in a casing 57' is fastened to a threaded sleeve 58'. The sleeve 58' is clampled to the end plates 66 by a nut 59'. The cable 13 extends through the sleeve 58' around the spool 88 and is clamped to a lug 89 on the end plate 66 by a screw 92. As shown in FIG. 9, when the cable 13' is moved to the left, the spool 88 and flat spring 72 will be moved from the position shown in chain-dotted lines to the position shown in solid lines. With this arrangement, a mechanical advantage of two to one is provided and also the adjustment to the cable 13' is located on the brake frame 62 at an easily accessible position.

Figure 8:
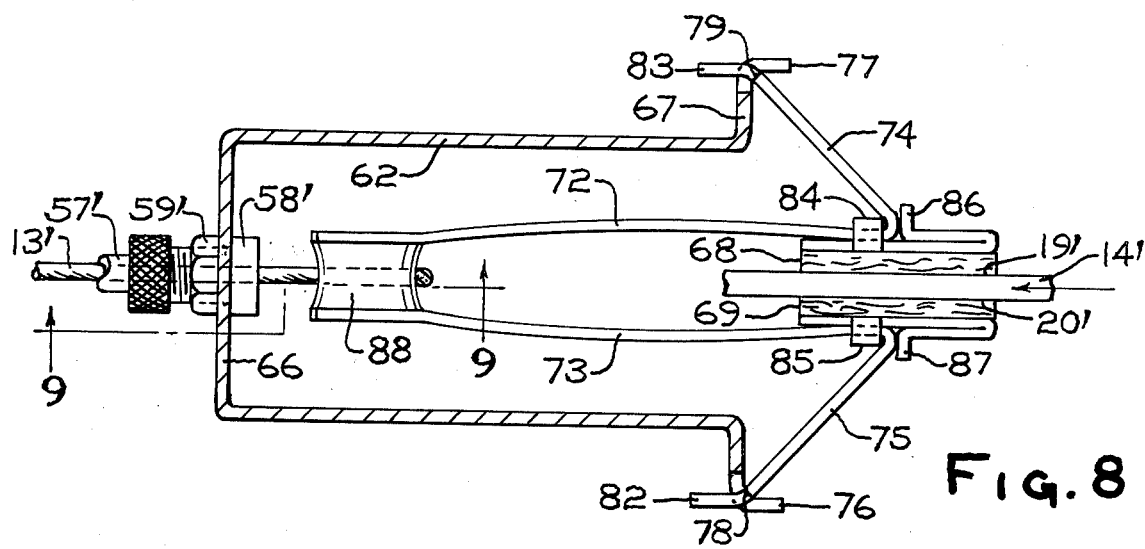
FIG. 8 is a plan view like FIG. 7 showing the brake of FIG. 6 in the engaged condition.

The modification shown in FIGS. 6, 7, 8 and 9 locates the friction lining pads 68 and 69 in a position on opposite sides of the friction surfaces 19' and 20' in the same relationship as that described for the embodiment of FIGS. 1 through 5. When the brake is actuated by moving the cable 13' to the left as shown in FIGS. 7 and 8, the arms 74 and 75 are swung inwardly towards the friction surfaces and in a direction substantially the same as the direction of rotation of the disc 14'. Upon engagement of the friction lining pads 68 and 69 with the friction surfaces 19' and 20', the rotation of the disc 14' is in a direction to increase the braking engagement providing a self-energizing action for the brake. Furthermore the brake's actuation is symmetrical with substantial equal pressure being applied by both lining pads 68 and 69 on the opposite sides of the disc 14'.

With the construction shown in FIGS. 6, 7, 8 and 9, the lining pads 68 and 69 are permitted to swing around the clips 84 and 85 in a "floating" condition to equalize the wear over the faces of the pads. When the friction lining material of the pads 68 and 69 has been worn away, it is a simple matter to lift off the lining pads and replace them with pads having new linings.

The brake constructions described hereinabove may be made of steel or other metal; however, it is contemplated that some parts may be made of plastic or other suitable material. The lining for the brake lining pads is of an organic friction lining material; however, other suitable materials may be used without departing from the scope of the invention.

I claim:

1. A disc brake comprising:
   a. a rotatable disc for mounting upon a rotating object, said disc having a flat friction surface on at least one side thereof;
   b. support means adjacent the disc;
   c. an arm member having one part generally parallel to and adjacent the flat friction surface of said disc, with a resilient portion extending at an acute angle relative to said part of the member on the side thereof opposite the disc with the end of said portion pivotally connected to said support;
   d. friction means facing the flat friction surface of the disc in spaced relation thereto and attached to the arm member;
   e. means for moving the arm member in a direction which increases the angularity of said resilient portion and which is substantially in the direction of rotation of the disc to thereby engage the friction means with the disc whereby the rotation of the disc will increase the pressure of the friction means against the friction surface of the disc.

2. The assembly in claim 1 wherein:
   a. the disc has a flat friction surface on each side;
   b. there are two arm members, one on either side of the disc, each provided with friction means; and,
   c. the arm member moving means is attached to both members.

3. The assembly in claim 2 wherein the resilient portion of each arm member is an integral outwardly extending portion thereof.

4. The assembly in claim 3 wherein the support comprises a rigid nonrotatable body having a generally U-shaped cross section with an outwardly extending flange at an open end.

5. The assembly in claim 4 wherein said support further has an end plate at a closed end which is opposite said open end and also has portions extending opposite the sides of the disc having the frictional surfaces.

6. The assembly in claim 4 wherein the support has portions extending on both sides of the disc.

7. The assembly in claim 3 wherein the length of the integral outwardly extending portion of each arm member is less than that of the remaining portion of the arm member.

8. The assembly in claim 7 wherein the arm member comprises a flat spring.

9. The assembly in claim 3 wherein the two arm members are connected at the ends opposite the integral outwardly extending portions.

10. The assembly in claim 3 wherein the friction means comprises a friction lining pad removably attached to the arm member.

11. The assembly in claim 3 wherein the friction means is movably mounted on the part of the arm that is generally parallel to the disc and adjacent the location of the said integral portion.

12. The assembly in claim 3 wherein a friction lining pad is rockably mounted on the part of each arm that is generally parallel to the disc and adjacent the area of maximum curvature defined by the integral outwardly extending portion.

13. The assembly in claim 10 wherein each friction lining pad is rockably mounted on each arm in a manner such that the pads will self align to small angular deviations of the arm members relative to the disc.

14. The assembly in claim 13 wherein the friction lining pad is a body having a substantially rectangular shape,
   the body having a projection on one side extending from one edge to the opposite edge and substantially parallel to the remaining edges on that side,
   the body also having a securing clip attached to an edge having a projection and extending along the same side substantially parallel to the projection and spatially arranged therewith to define an L-shaped slot for reception of the arm adjacent its connection with the integral portion,
   the body also having a friction lining mounted on the side opposite the side defining the L-shaped slot.

15. A disc brake adapted for use upon a rotatable body having an annular friction surface comprising:
   a. a rigid nonrotatable support adjacent the annular friction surface having a portion extending opposite the friction surface;
   b. a spring arm extending generally parallel to and opposite the friction surface, one end of the arm having an integral outwardly extending portion at an acute angle to the outer side thereof, the free end of said integral portion being pivotally attached to the supporting body;
   c. a friction lining pad attached to the side of the spring arm adjacent to and facing the friction surface and supported in spaced relation thereto;
   d. means for moving the arm in a direction which increases the angularity of the integral outwardly extending portion and which is substantially in the direction of rotation of the rotating body to thereby engage the friction lining pad with the friction surface of the rotating body whereby the rotation of the rotating body will increase the pressure of the friction pad against the friction surface of the rotating body.

16. The assembly in claim 2 wherein the resilient portion extending at an acute angle relative to the part of each arm member which is parallel to the disc comprises a wire spring connected to the arm member and mounted on the supporting body to provide swinging movement of the arm member away from the disc.

17. The assembly in claim 16 wherein the friction means comprises a friction lining pad adhered to the arm member.

18. The assembly in claim 17 wherein each wire spring comprise a pair of spaced portions fastened to an arm member at spaced-apart positions for guiding the movement of the arm member whereby each friction lining pad is evenly pressed against a friction surface of the disc during braking operation.

19. The assembly in claim 18 wherein the ends of each pair of spaced portions of each spring member are bent inwardly for pivotal engagement of the edges of a friction pad.

20. The assembly in claim 16 wherein each spring connected to each arm member comprises an integral loop portion removably mounted on the supporting body for swinging movement of the arm member relative to the disc.

21. The assembly in claim 20 wherein the supporting body comprises a brake frame extending around the edges of the disc and having an outwardly extending flange on which the two wire springs are mounted.

22. The assembly in claim 2 wherein the arm members extend in a direction substantially tangentially to the disc to a position beyond the disc for connection to a cross member, the arm members having openings for receiving the cross member, the cross member receiving a tension applying member for applying braking force equally to the arm members whereby the movement of the friction means is substantially the same for equal braking engagement of the friction means with the friction surface of the disc.

23. The assembly in claim 22 wherein the cross member consists of a U-shaped bracket having flanges overlying the sides of the arm members with the surfaces of the flanges adjacent the arm members being smooth to permit self-alignment of said arm members with said friction surfaces upon wear of said friction members during the life of the brake.

24. The assembly in claim 23 wherein the friction means comprises a friction lining pad adhered to each arm member.

* * * * *